Oct. 30, 1962     M. KEMENCZKY     3,060,682
JET PROPULSION ENGINE FOR WATERCRAFT
Filed July 1, 1960     6 Sheets-Sheet 2
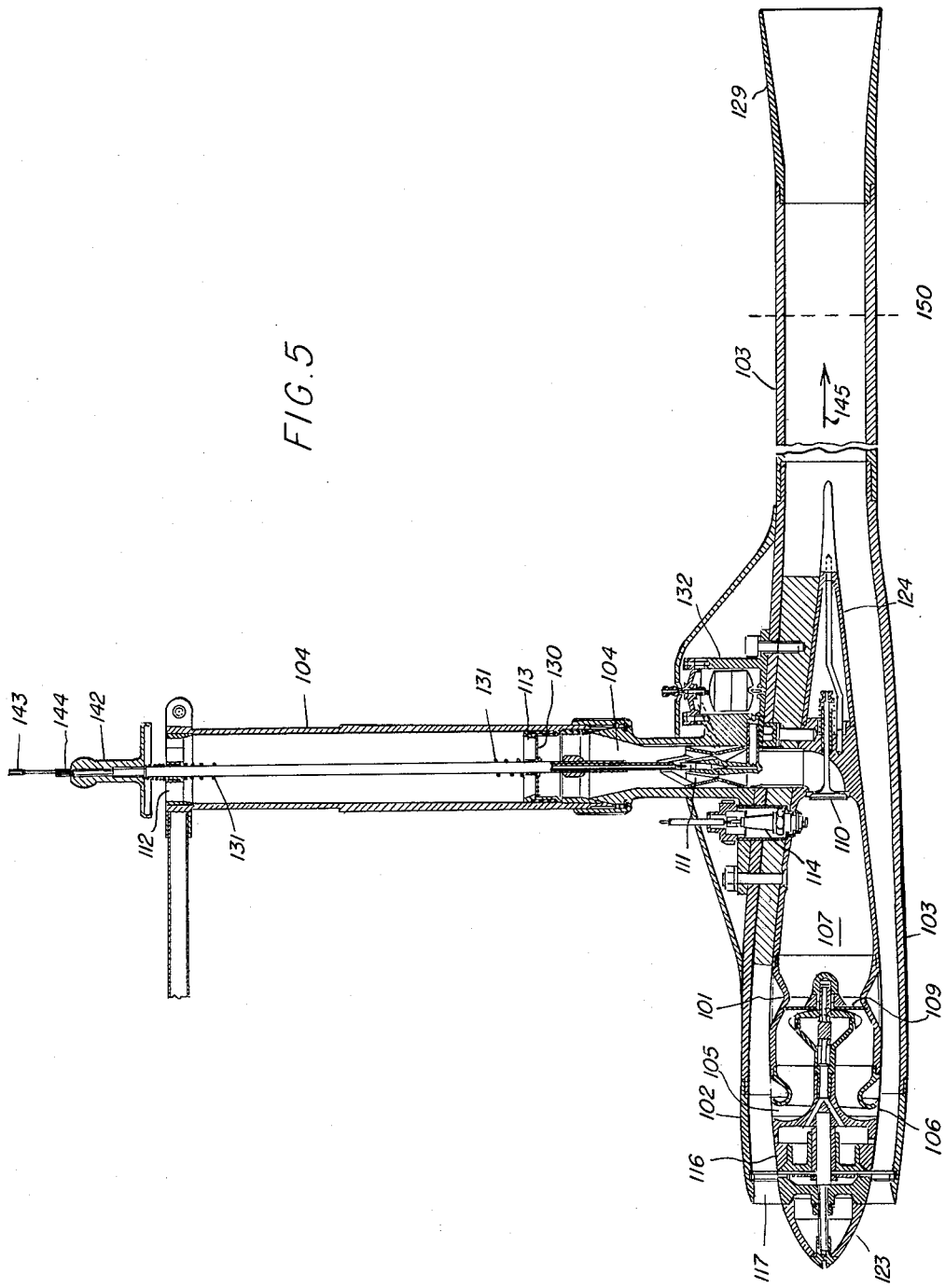

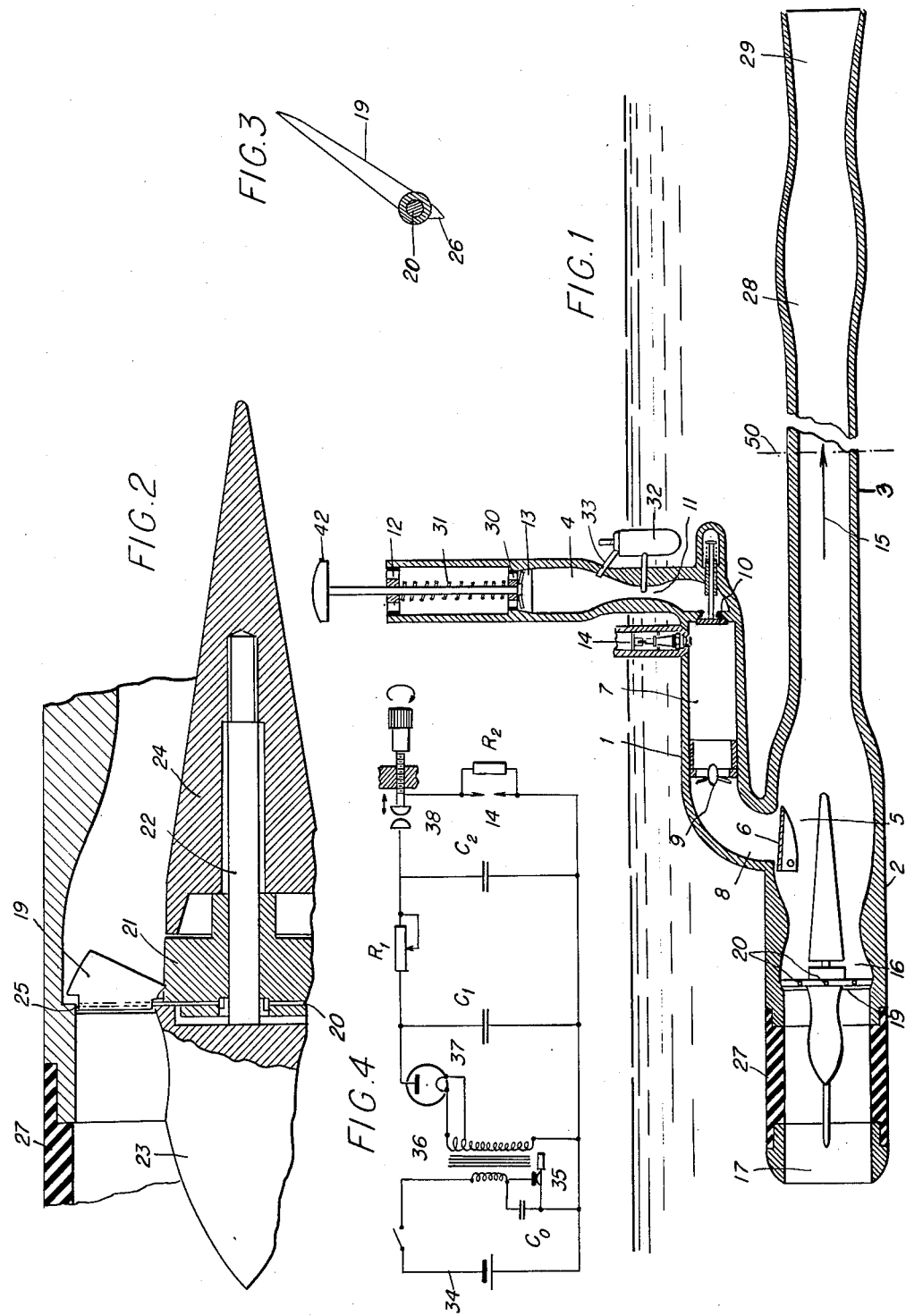

Oct. 30, 1962 M. KEMENCZKY 3,060,682
JET PROPULSION ENGINE FOR WATERCRAFT
Filed July 1, 1960 6 Sheets-Sheet 6

3,060,682
JET PROPULSION ENGINE FOR WATERCRAFT
Miklos Kemenczky, Reutlingen, Germany, assignor, by mesne assignments, to Kemenczky etablishement, Vaduz, Liechtenstein
Filed July 1, 1960, Ser. No. 40,452
12 Claims. (Cl. 60—35.6)

The present invention relates to a jet propulsion engine for watercraft, and it is the primary object of the invention to provide an engine of the mentioned type which is designed according to entirely new principles.

Another object of the invention is to provide a check valve for this new kind of jet propulsion engine which has a very low inertia and reacts very quickly.

A further object of the invention consists in providing an ignition apparatus which is especially adapted to comply with the requirements of a jet propulsion engine for watercraft.

The engine according to the invention is a jet propulsion engine of the type in which charges consisting of a mixture of air and an easily and quickly combustible fuel are drawn into a combustion chamber and are then ignited therein in successive explosions, and in which the combustion gases are passed through a one-way flap valve into a thrust tube which has a water inlet opening which is controlled by a check valve, and a discharge opening at the rear end of the thrust tube. The combustion gases act upon the water column within the thrust tube in a manner similar to a piston by ejecting the water from the thrust tube and thereby producing a jet reaction to propel the engine forwardly.

The jet propulsion engines of this type which are presently known only develop a relatively low output because the compression attained by them is insufficient, and the starting of the engine and the ejection of the water from the thrust tube causes resistances of such a magnitude as to render the engines rather inefficient.

In one of these prior jet propulsion engines as disclosed, for example, in the U.S. Patents Nos. 2,644,297 and 2,714,800, the combustion chamber extends from the ignition point directly to the opening into the thrust tube which is controlled by a flap valve, and the thrust tube is provided at its front end with a flap valve assembly which operates as a check valve. This valve assembly gives the thrust tube an extremely great front resistance since it consists of a large number of long lamellar blades which cause a considerable flow resistance along their entire length, and the structure of this assembly is also not adapted to comply with the requirements of operation of such a pulsating drive since these valve blades cannot open and close as rapidly as necessary.

Another known type of jet propulsion engine for watercraft as disclosed, for example, in the French Patent No. 1,043,920, requires a separate compressor and is already for this reason unsuitable to form a light propulsion unit which may be used independently of any additional driving means. The requirement of a jet propulsion engine for boats and similar watercraft of being easily manipulatable and very economic in operation is also not fulfilled by a type of engine as disclosed, for example, in the U.S. Patent No. 2,412,825, in which the discharge part of the thrust tube operates according to the Venturi principle, while the inlet side of the thrust tube is not provided with any valve. Jet propulsion engines of this type, which also require separate driving means for starting the engine, operate very inefficiently. Because of the almost complete absence of a compression within the combustion chamber, this lack of efficiency also applies to another type of jet propulsion engine for watercraft as disclosed, for example, in the German Patent No. 841,552, in which the upper part of a tubular work chamber forms a combustion chamber, while the lower part thereof which forms a direct continuation of the upper part is provided with a water inlet opening which is controlled by a flap valve and an opening at its rear end for ejecting the water. This type of water inlet will only permit a very slow succession of explosions, and has been found entirely inadequate in actual practice. Similar disadvantages are inherent in a pump of the type as disclosed, for example, in the German Patent No. 878,599, which operates according to the jet propulsion principle and may also be used for propelling ships. In this apparatus, the combustion chamber which is provided with a baffle plate which covers only a part of this chamber terminates directly without any intermediate check valve into a thrust tube, the front end of which is provided with a flap valve for controlling the water inlet, and the rear end of which is likewise provided iwth a valve which is intended to close the discharge opening to prevent any water from entering in the opposite direction. This rear valve, however, destroys almost the entire energy which is developed by the engine. Consequently, the efficiency of this pump— at least insofar as it may be used as a propulsion unit for a boat—is very poor.

According to the present invention, these deficiencies of the known jet propulsion engines for watercraft and especially small boats are overcome by providing such an engine with a combustion chamber which is divided into at least two compartments which are separated from each other by check valves and the last compartment of which terminates into the thrust tube, and by designing the valve which controls the water inlet opening of the thrust tube in the form of a low-inertia, quickly reacting check valve which operates in a manner similar to a turbine wheel and is provided with closing flaps in the form of blades which are pivotable about radial axes and are mounted on a freely rotatable wheel hub which is driven by the flow of water passing through this valve.

A jet propulsion engine which is designed in this manner will attain a high output even though it is not provided with a special compressor. For operating the engine, it is possible to use either liquid or gaseous fuels which, when mixed with air, form a highly explosive mixture. The engine may therefore be operated, for example, with gasoline of the same type as used in conventional carburetor engines. By dividing the combustion chamber into two or more separate chambers, the invention attains an additional compression of the combustible gases and thus a greater output of power due to an improved and more complete combustion.

It is generally known as such that the explosion pressure of an engine may be improved by dividing the combustion chamber into several parts which are separated from each other by constrictions or by disk valves or the like. Thus, for example, in pumps for conveying heated gases, such a chain of chambers has been used for attaining an increase in pressure even of such explosive mixtures which were not precompressed in the first chamber. This principle has, however, never been applied to jet propulsion engines for watercraft in which a preliminary compression is absolutely necessary in order to attain a high degree of efficiency. The advantages of the precompression may, however, be realized in the special art of jet propulsion engines for watercraft only if suitable provision is made to prevent the precompression from being nullified by the occurrence of strong impacts or vibrations, as may easily occur in a reaction propulsion medium such as water. According to the invention it has been found that this is possible only by the development of a low-inertia check valve at the inlet side of the thrust tube which permits the water inlet opening thereof to be opened and closed in accordance with the rate of the explosion and so quickly and completely that, when the inlet opening is opened, the water may pass into the thrust tube substantially without causing any friction so that a practically continuous travel of the water through the thrust tube will be insured. This will be attained according to the invention by the mentioned check valve of a design similar to a turbine wheel which has the lowest possible inertia and reacts as quickly as possible, and which is provided with blades which are rotatable about radial axes so as to exert a valvelike closing action. Such a check valve is far superior to the lamellar valves with long resilient blades as used in previous jet propulsion engines, especially insofar as the speed of its reaction or adjustability, its ability of tightly closing, and of allowing the water to pass without causing any turbulence are concerned.

The proper operation of the jet propulsion engine according to the invention requires the combustion gases to be passed into the thrust tube as rapidly as possible. On the other hand, the relative adjustment between the thrust tube as a whole and the combustion chamber which is divided into several smaller compartments for increasing the compression is of a minor importance. The combustion chamber may therefore be disposed either outside or within the confines of the thrust tube. Behind the point of entry of the combustion chamber into the thrust tube, that part of the thrust tube is located in which the the water is accelerated and ejected as by a piston toward the rear. The rear ejection part of the thrust tube may also be provided with an expanded portion which acts as an expansion cushion to absorb and suppress the impacts and vibrations. The rear end of the thrust tube is provided with a pressure increasing tubular trumpet-like outlet. The combustion gases and the water column which is propelled thereby are ejected from the thrust tube in a manner as if the water were a piston. For this reason, the ejection tube is also provided with a smooth inner wall.

The check valve at the water inlet end of the thrust tube, which in the embodiment as described is designed similar to a freely rotatable turbine wheel with pivotable blades which form the valve closing flaps, constitutes a novel type of valve which may be applied not only to jet propulsion engines of the mentioned type but may also be employed as a check valve in conduits and pumps of any kind in which liquids, vapors, or gases are to be conveyed in only one direction. Such a valve may principally be applied in any case in which recoil shocks might be expected and where a reverse current in a direction opposite to the normal direction of flow must be prevented, for example, in ventilation impellers in mining operations and the like. Such a low-inertia check valve insures a smooth flow of the respective medium in one direction practically without friction, whereby the valve blades will be pivoted to the open position, while in the direction opposite to the normal flow of the current such a freely revolving valve wheel with a self-controlled blade adjustment will form a closed disk which blocks any return flow. The pivotable blades of this valve which serve as turbine vanes are also subjected to the action of the centrifugal force which exerts a certain directional effect upon the blades. This is due to the fact that, when the valve is in the closed position, the center of gravity of each pivotable blade is spaced at a greater distance from the axis of rotation of the entire valve than when the valve is in the open position. When the valve retates, the mass of the blades is subjected to the outwardly directed centrifugal force which tends to shift the center of gravity of each blade to a position as remote from the axis of rotation as possible, that is, to the fully closed position of the blades. Thus, there are no valve springs required.

The check valve according to the invention which operates so quickly as to have practically no inertia combines the advantages of a simple and compact structure with that of a secure closing action in the reverse-current direction and that of an almost resistanceless opening movement in the direction of flow. The change from one operative position to the other occurs quickly and practically without waste of any energy.

In addition to these advantages, the revolving check valve according to the invention may, when applied to a jet propulsion engine for watercraft as previously described, also be provided with sharp cutting edges on the entry side of the pivotable blades in order to cut up aquatic plants and the like which might be dragged with the water into the inlet opening, and thereby to prevent such foreign substances from clogging or damaging the engine.

For igniting the fuel mixture within the combustion chamber by means of a conventional spark plug it is further advisable to provide a special ignition apparatus which is adapted to the particular conditions under which jet propulsion engines of the mentioned type have to operate for driving a boat. This ignition apparatus must be capable of rendering the spark plug and the combustion chamber as insensitive as possible to the moisture which is not avoidable in the operation of a boat. Furthermore, the ignition timing must be adapted to the particular conditions of such pistonless pulsating engines in which no rotating or reciprocating parts are available which could be used for controlling the ignition timing. Finally, when such engines are not in operation, the spark plugs thereof will be relatively moist so that a very strong and reliable ignition apparatus must be provided to overcome such moisture. When the engine is started, the ignition spark must be so strong that the moisture on the spark plug will be quickly evaporated and the fuel mixture will be ignited. During the operation of the engine, however, when the water cannot reach the spark plug to the same extent as when the engine is stopped, the ignition sparks may accordingly be weaker. On the other hand, they must then occur in a more rapid succession depending upon the output which is required of the engine at any particular time. The sequence of the operation and the output of such engines is therefore controlled merely by the number and sequence of the ignitions which have to be regulated by the ignition apparatus itself.

In order to comply with all of these requirements and thus to attain a jet propulsion engine with a degree of reliability which fully complies with all conditions which might occur during the operation, it is advisable to provide an ignition apparatus of the type which comprises a direct-current source of high tension and, connected in parallel to the terminals of such a source, a high-tension charging condenser as well as two spark gaps which as such are connected in series. One of these spark gaps is designed so that, when its flashover value is reached, it will effect the discharge of the condenser and thus also the flashover of the other spark gap, that is, of the spark plug. If such an ignition apparatus is applied to a pistonless jet propulsion engine for watercraft as previously described, the invention further provides that the spark or ignition power of the spark plug which is determined by the voltage times the amperage of the spark, and the sequence or frequency of the sparks which is inversely proportional to the spark power and determines the engine output may be regulated by an adjustment of the auxiliary spark gap which is connected in series with the spark plug.

When the engine is started at a time when the spark plug is still moist, the flashover voltage on the spark plug may be made very high by adjusting the auxiliary spark gap so that the electrodes thereof will be at a considerable distance from each other. When using a high voltage, the charge of the ignition condenser will also be very high prior to the flashover and in this manner a spark will be produced which will quickly evaporate any possible moisture on the spark plug and will insure a proper ignition of the combustible mixture. After the engine has been started and when the conditions in the combustion chamber are more favorable for an easy ignition, the energy of the spark may be reduced. This may be attained by reducing the distance between the electrodes of the auxiliary spark gap with the result that the flashover will then occur at a lower voltage. This, in turn, will also reduce the length of time required for charging the ignition condenser with the result that the frequency of the ignitions within a given length of time will be increased, that the engine will run at a greater speed, and that its output will be increased. Due to the fact that the energy of the ignition spark may be regulated in accordance with the prevailing conditions and that it may be reduced under more favorable conditions, the storage batteries of the ignition apparatus will be used very sparingly.

These and still further objects, features, and advantages of the present invention will become more apparent from the following detailed description thereof, particularly when the same is read with reference to the accompanying drawings, in which—

FIGURE 1 shows a diagrammatic longitudinal section of the jet propulsion engine according to the invention;

FIGURE 2 shows on a larger scale a partial longitudinal section of the part of the thrust tube according to FIGURE 1 in which the freely revolving check valve together with its pivotable blades is mounted;

FIGURE 3 shows a view of one of these blades with a sharpened cutting edge, as seen in the direction of the pivotal axis thereof;

FIGURE 4 shows a diagrammatic illustration of an ignition apparatus which is especially adapted for the operation of the jet propulsion engine according to the invention;

FIGURE 5 shows an over-all view in a longitudinal section of a modification of the jet propulsion engine according to the invention;

FIGURE 10 shows a side view of the check valve according to FIGURE 9; while

Figure 6:
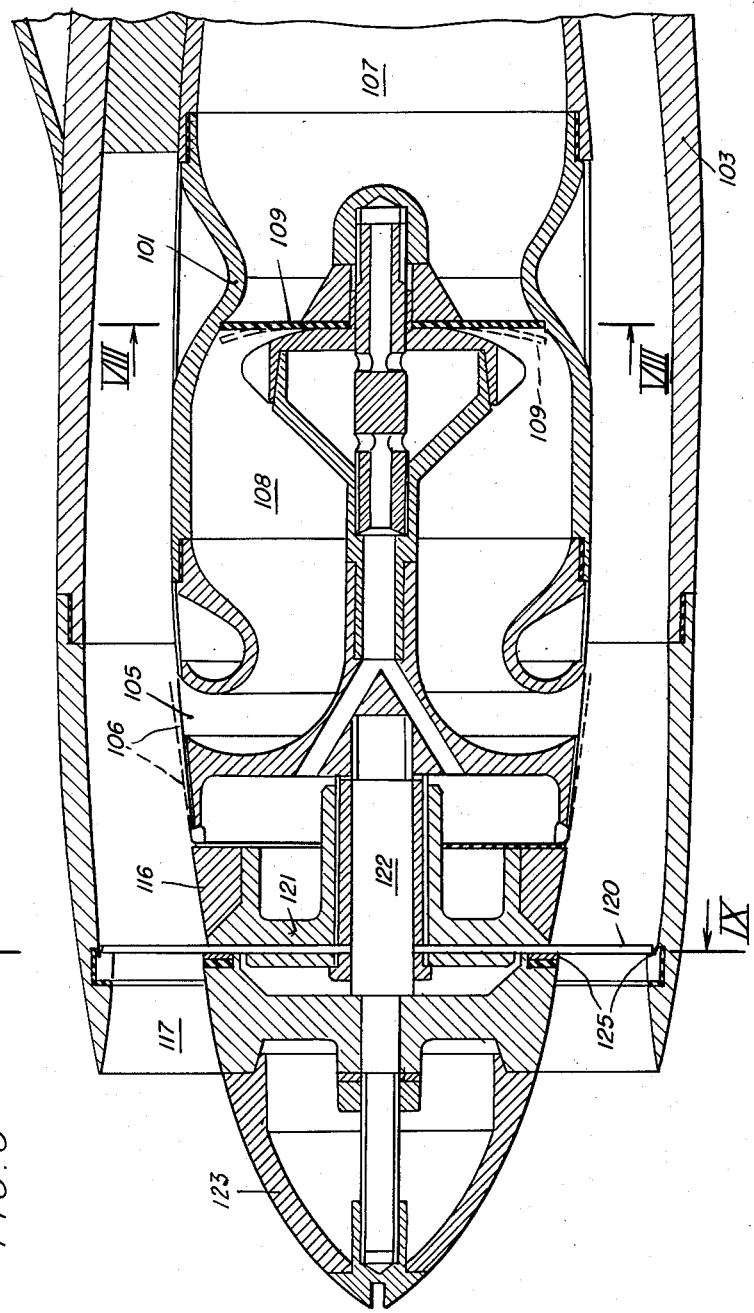
FIGURE 6 shows on a larger scale, a longitudinal section of the front part of the engine according to FIGURE 5.

In order to explain the invention more easily and to indicate the similarity of the two preferred embodiments thereof as illustrated in FIGURES 1 to 3 and 5 to 11 of the drawings, respectively, those parts of the two embodiments which are similar to each other are identified by corresponding reference numerals, except that the numerals in FIGURES 5 to 11 are increased by 100 over those applied in FIGURES 1 to 3.

Referring first to FIGURES 1 to 3 of the drawings which illustrate the first embodiment of the invention diagrammatically, the engine consists of a fuel combustion chamber which is enclosed by wall portions 1, and of a thrust tube 2, 3 which is intended to be entirely submerged in the water. The opening 5 which connects the combustion chamber with the thrust tube 2, 3 is adapted to be opened or closed by a flap valve 6. The opposite end of the combustion chamber is connected to a starting pump 4, the pump piston 13 of which is tightly slidable in the pump housing and has two flap valves 30 in its bottom which automatically open in the downward direction when the fuel mixture is drawn into the combustion chamber. The outer end of the connecting rod of piston 13 has a handle 42 for the manual operation of the pump, and a spring 31 is interposed between the upper and lower ends of the pump chamber and tends to move the pump piston in the downward direction.

In order to attain a preliminary compression for increasing the efficiency of the combustion the combustion chamber is divided into several parts, for example, into compartments 7 and 8. Compartments 7 and 8 are separated by a flutter valve 9 serving as a check valve and opening into the second compartment 8. Compartment 7 contains a spring-loaded disk valve 10 through which the fuel mixture is drawn from the carburetor 11. The combustion air flows to carburetor 11 through apertures 12 in the end of the pump housing and through piston 13 of the pump which, when the engine is in operation, is in a stationary position. The housing of this hand-operated starting-air pump therefore also forms a part of the intake pipe for the combustion air.

Behind intake valve 10, compartment 7 contains a spark plug 14 which is controlled by an ignition apparatus which is illustrated diagrammatically in FIGURE 4. This ignition apparatus consists of a battery 34, the current of which is passed through a vibrator converter 35 to an ignition transformer 36 in which the current is transformed. A damping condenser $C_0$ is inserted into the primary circuit of the transformer. The secondary coil of transformer 36 for producing a high tension is also connected to a heating coil for the filament of a high-tension rectifier tube 37 which, however, may also be replaced by rectifying means of a differential kind, for example, a dry rectifier of a conventional type. The chopped direct current which is rectified by tube 37 flows into the loading condenser $C_1$ and is passed through a variable resistance $R_1$ into the operating condenser $C_2$ from which an adjustable auxiliary spark gap 38 is provided with the desired voltage. When the voltage of condenser $C_2$ has reached the flashover voltage of the auxiliary spark gap 38, a spark will flash over the electrodes of the latter and simultaneously over the electrodes of spark plug 14.

Spark plug 14 is bridged by a stabilizing resistance $R_2$ due to which the entire difference of potential of condenser $C_2$ will be effective at the auxiliary spark gap before a spark is formed. If this bridging resistance $R_2$ on spark plug 14 would be omitted, the flashover on the auxiliary spark gap 38 would be affected not merely by the distance between the electrodes of the spark gap, but also by the conditions prevailing on the spark plug, for example, by moisture, soot sediments, and the like. The resistance $R_2$ which is connected in parallel with the electrodes of the spark plug is made of such a size that, when the spark flashes over on the electrodes of the auxiliary spark gap, the charge of condenser $C_2$ cannot be immediately released and the voltage of this condenser will be passed to the electrodes of the spark plug so that a very strong spark will occur on the latter. In this connection, it is not of importance whether the distance between the spark plug electrodes is correctly adjusted since the spark plug will operate properly even though its electrodes are shorted which, in turn, will eliminate the moisture by quickly evaporating the same.

The auxiliary spark gap 38 is provided in the form of an adjustable pair of rotary contacts. As previously stated, the impulse frequency may be easily regulated by an adjustment of the distance between contacts 38 and also by an adjustment of the resistance $R_1$. If the distance between the contacts of the auxiliary spark gap 38 is varied, this will also change the force of the ignition spark. If the distance between the contacts is great, the flashover voltage and thus also the charging voltage of the ignition condenser $C_2$ will be high, and the latter will within a relatively short time become charged to a high charge in accordance with its capacity and the voltage applied. The ignition spark will therefore not occur very frequently but with great power. If the distance between the contacts of the auxiliary spark gap 38 is reduced, the flashover and charging voltage will be lower, the charging will occur more quickly and the ignition will occur more frequently. Thus, by adjusting the auxiliary spark gap 38 in accordance with the operating conditions of the engine it is possible to produce either a very strong and hot spark or a smaller spark which occurs more frequently and requires less current. It is therefore possible to control the output of the engine merely by adjusting the ignition. When starting the cold engine, the contact distance of spark gap 38 is at first made rather large so that a more powerful spark will be attained which eliminates the moisture contained within the combustion chamber. In the continued operation of the engine, the contact distance of spark gap 38 is then preferably reduced in order to shorten the ignition sequence and to increase the pulsation and output of the engine. Since the spark sequence may be made very rapid and several times shorter than in the known inductive methods, it is also possible to control such engines properly and reliably which have a very high rate of pulsation.

Instead of being produced by the vibrator converter 35 and the ignition transformer 36, the high alternating voltage may also be produced in a known manner by electronic high-frequency oscillations by means of a tube and a transistor.

The ignition apparatus as previously described also insures that the starting explosions will occur properly, regardless of whether the electrodes of the spark plug which is submerged in water will be moist or covered with soot. The output of the engine will be controlled by the rate of the explosions and the increase in the frequency at which these explosions occur as the driving speed increases. The ignition sparks which have the strength of explosions also have the advantage that a reliable ignition will be insured even though the mixing ratio of fuel and air may vary. There is thus no danger that, when the explosions first start in compartment 7 under a pressure slightly in excess of atmospheric pressure, variations in the mixing ratio of the fuel and air might result in interferences, as occur easily when applying the normal ignition apparatus operating by induction. On the contrary, the much stronger spark produced by the ignition apparatus according to the invention will reliably produce strong explosions even of mixtures of different mixing ratios.

The pressure wave which then occurs will force the explosive fuel mixture from the first compartment 7 through the flutter valve 9 more quickly into compartment 8 than the flames are able to spread. Consequently, in the second compartment 8 of the combustion chamber the fuel-air mixture will be a precompressed condition which is of great importance for attaining a strong output. For attaining this condition, that is, for compressing the mixture from compartment 7 to compartment 8, only a small amount of fuel needs to be combusted. The flame will finally pass through the flutter valve 9 and will also ignite the compressed mixture in compartment 8, whereupon the expanding combustion gases will pass through the flap valve 6 and act with great intensity upon the water in thrust tube 2 and eject it from its discharge part 3. In order to increase the precompression effect as above described, the combustion chamber may be divided into three, four, or more compartments which are separated from each other by low-inertia valves of the tongue or flutter type. These valves also act as check valves to prevent a recoil action toward the preceding chambers in which a lower pressure exists.

While due to the violent explosions in the combustion chamber the water in thrust tube 2, 3 will be ejected toward the rear in the direction as indicated by arrow 15 in FIGURE 1, and the engine will by the force of the reaction be driven forwardly, the rotary check valve 16 which is mounted in the front part of the thrust tube and which will be subsequently described in detail will prevent the water from being also ejected through the inlet opening 17. The ejection tube 3 is made of such a length that the expanding gases will be able to push the water only approximately to a point indicated in FIGURE 1 by the line 50. Behind this line, the gases will again contract. Due to this contraction and the inertia of the quickly ejected water, a vacuum will be produced in compartments 7 and 8 of the combustion chamber, whereby a fresh supply of fuel mixture will be sucked in through disk valve 10, carburetor 11 and pump 4. The vacuum also sucks at the same time a new supply of water through the front inlet opening 17 and the rotary check valve 16, and due to this action and also due to the pressure head caused by the driving speed, the thrust tube 2, 3 will again be very quickly filled with water. Thereafter, the same procedure as described above will be repeated as the next ignition occurs in the combustion chamber.

The output of the engine will increase in accordance with the number of explosions within a certain period of time. The faster the explosions succeed each other, the greater will be the thrust. A rapid succession of explosions is therefore important not only in order to attain a high efficiency of the engine, but also for attaining a high engine output. If an explosion would occur, however, while there is still a vacuum in thrust tube 2, 3, such an explosion would be of a lower strength. It is therefore of importance that the suction or intake period will be quickly terminated. The flap valve serves for the purpose of preventing any undue turbulence; it therefore has no material effect upon the thermal and pressure proceedings as above described. This valve is not even supposed to close heremetically since the excess pressure which is produced at the end of the suction period in part 2 of the thrust tube which forms the housing enclosing the water inlet valve 16 is to be balanced with the pressure in compartment 8 of the combustion chamber.

The water inlet valve 16 of the thrust tube which serves as a check valve is designed in the form of a revolving turbine wheel, the blades of which are rotatable about radial axes and are acted upon by the current of water passing therethrough and also by the centrifugal force caused by the rotation of the entire valve. The requirements to which this water inlet valve has to comply according to the invention are that the valve should have the lowest possible inertia and operate as quickly as possible as well as absolutely reliably, that it must be capable of withstanding the high pressure of the explosions and be able to admit as much water as possible immediately after each explosion, that it should have the lowest possible front resistance and flow resistance, and that it should also not become clogged or be disturbed in its function by smaller and larger impurities floating in the water. For attaining all of these objects, the check valve according to the invention has been designed in a form similar to a freely revolving turbine wheel. It has been found to fulfill excellently all of the mentioned requirements and to permit a rate of explosions within a certain period of time which is several times as high as the rate which was possible with the valves which were used previously and which is so high that the water will flow through the thrust tube almost continuously.

The check valve according to the invention therefore consists of a wheel hub 21 which is mounted in the thrust tube so as to be freely rotatable therein about the central axis of shaft 22 in a manner similar to a small freewheel turbine when the water flows through the front inlet opening 17 into thrust tube 2. For understanding the following description of the details of this turbine more clearly, reference is also made to FIGURES 9 and 10 which illustrate the corresponding parts of the second embodiment of the invention. For producing the desired rotation of the turbine wheel, hub 21 thereof is provided with a plurality of blades 19 which are mounted thereon so that each of them is pivotable about a radial axis like a flap. By providing front and rear guide members 23 and 24 of the most appropriate streamlined shape within the direction of flow in the thrust tube, the water will be able to flow into and through the thrust tube with the least possible friction and turbulence. If, when the water passes into the thrust tube, there is a lower pressure in the front part 2 thereof than in the water outside, blades 19 together with hub 21 will act like a turbine wheel and revolve at a considerable speed. The water then flows toward the thrust tube in a straight direction without spinning, and the rotation of hub 21 will be produced by a lateral impact acting upon each blade since after each explosion the in-flowing water must first open the closed blades or flaps. This results in a torque about the valve axis. The blades are then pivoted slightly toward the rear from the plane of rotation of the radial axes of the blade supports which extends transverse to the driving direction, as indicated in dotted lines in FIGURE 10. At the time of the explosion, that is, when an excess pressure prevails at the inside of the thrust tube, blades 19 will immediately return from the pivoted position to the closed position within the mentioned plane of rotation. They will then immediately engage with the concentrical supporting edges 25 and thereby form an annular disk which prevents any movement of water in the direction toward the inlet opening 17. This conversion from an open-air turbine into a check valve occurs periodically in accordance with the rate of explosions and while the check valve revolves continuously. The edges 26 of the blades or valve flaps which extend in the direction of rotation are sharpened so as to cut all aquatic plants which might enter with the water into small particles so that they will not cause any clogging of the thrust tube and will be easily ejected from its discharge end.

The wall portion 27 between the water inlet opening 17 and the front part 2 of the thrust tube in which the revolving check valve is mounted may consist of an elastic material, for example, rubber. If after the entry of the water the valve flaps 19 are closed due to the explosion so that a continued flow of water will be prevented, the pressure head and the kinetic energy of the water entering in front will then cause the rubber wall 27 to bellow outwardly so that the kinetic energy will thus be converted into potential energy. This potential stored-up energy will become again converted into kinetic energy as soon as the flaps or blades of the revolving check valve again open, whereby the water will also be given an additional acceleration to facilitate the flow into the adjacent part of the thrust tube.

Since the rapid succession of violent explosions in the combustion chamber and the impacts caused thereby upon the column of water in the thrust tube might cause undesirable shocks and vibrations of the entire engine and the body of the boat, the end of the actual thrust tube may be designed as a shock absorber or cushion by being provided with an expanded portion 28 in which the exhaust gases are also compressed before passing out of the outlet 29. During the interval between two successive explosions, this cushioning chamber 28 contains a higher pressure than the remainder of the exhaust tube 3. Since the water will pass from this cushioning chamber 28 through the exhaust tube to the outside, the vibrations will be considerably suppressed. The rear end of the exhaust tube 3 is further provided in the usual manner with a trumpetlike nozzle 29 which increases the force of the jet reaction.

For starting the engine, it is first necessary to feed the fuel-air mixture into the combustion chamber 1 by means of the hand pump 4. When pulling up the pump piston 13 against the action of spring 31, the air enters through the opened pump valve 30 into the piston chamber of pump 4. When releasing the pump handle 42, the pump piston will again be moved downwardly by spring 31, whereby the air will be forced through valve 10 into the combustion chamber 1. While flowing past the carburetor 11, the rapid current of air will take along the fuel. While the fuel mixture is being pumped into the combustion chamber, there will be a higher pressure in the carburetor and its float housing 32 than during the suction period. This might result in different mixing ratios between the fuel and air. In order to avoid this, it is advisable to connect the pump chamber 4 by a small tube 33 with the float housing 32 at a point above the fuel level therein. Thus, there will always be the same pressure difference between the carburetor nozzle and the float housing, regardless of whether the engine exerts a suction or whether the pump is actuated. The same carburetor adjustment may therefore be applied both for the fuel intake by suction as well as for pumping the fuel mixture into the combustion chamber.

FIGURES 5 to 11 illustrate a second embodiment of the jet propulsion engine according to the invention in which the combustion chamber is disposed at the inside of the thrust tube, although the design and structure of the engine is otherwise substantially the same as previously described with reference to the first embodiment according to FIGURES 1 to 3.

The thrust tube which is made of the most suitable streamlined shape has a front part 102 and a central and rear part 103. The combustion chamber is disposed centrally at the inside of the combustion chamber, the walls of which are likewise made of a streamlined shape. The main body containing the combustion chamber is secured within the thrust tube by strong bolts, while the front end of this body is secured in a central position to the front part 102 of the thrust tube by suitable connecting means with intermediate apertures. The inside of the combustion chamber communicates with the inside of the thrust tube through a plurality of apertures 105 in the wall of the combustion chamber which are covered by flap valves 106. As shown particularly in FIGURE 6, these flap valves are mounted so as to be pivotable about a point near the front end of the wall of the combustion chamber either to a closed position, as indicated in solid lines, or to an open position, as indicated in dotted lines.

Figure 7:
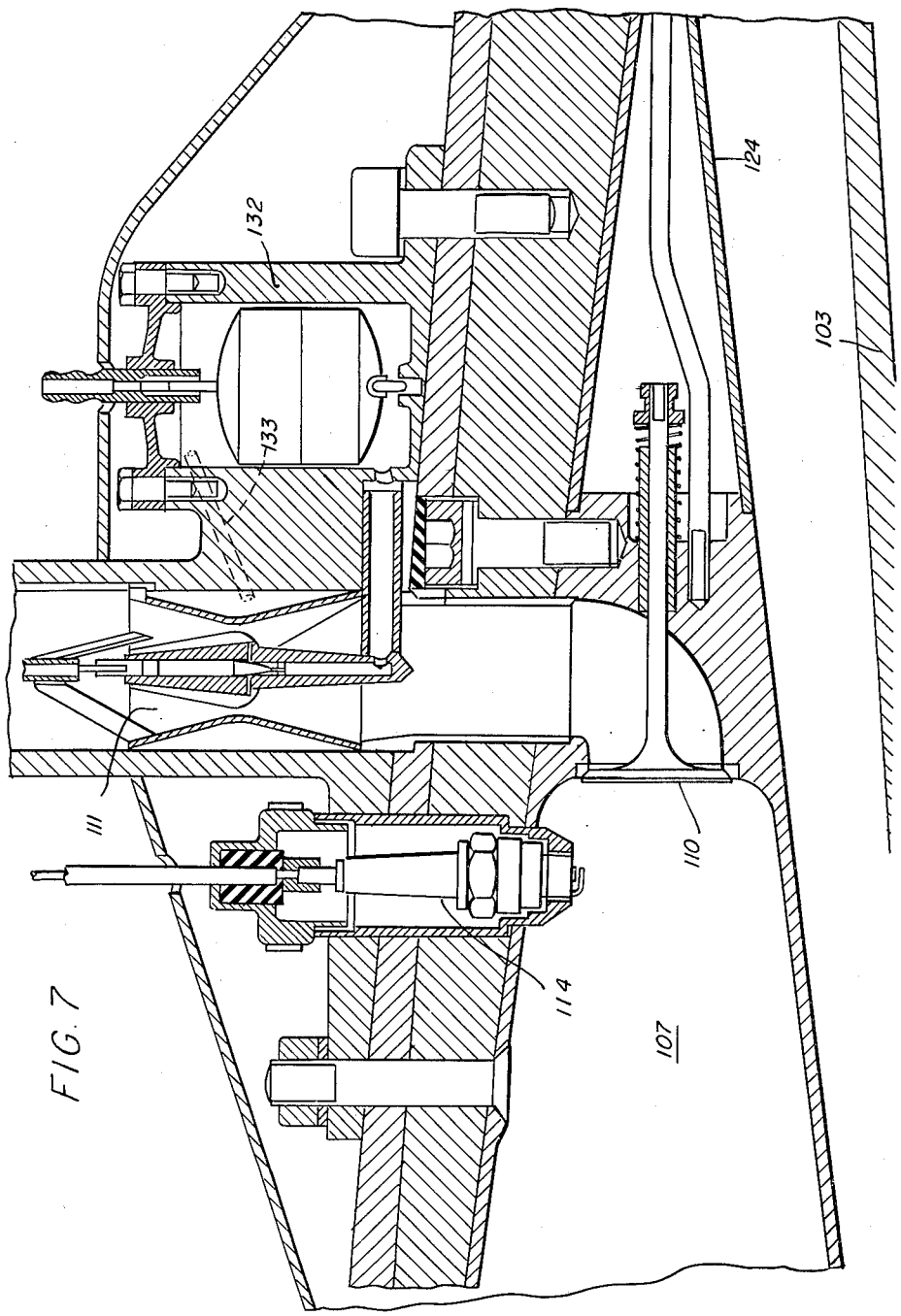
FIGURE 7 shows a similar view of the central part of the engine according to FIGURE 5.

The combustion chamber which is enclosed by a wall 101 consists similarly as in the first embodiment according to FIGURES 1 to 3 of two compartments 107 and 108 which communicate with each other through a flutter valve 9. As already stated, compartment 108 communicates with the annular surrounding area of thrust tube 102 through the apertures 105. At its rear end compartment 107 of the combustion chamber is connected with the starting pump 104 which extends above the water lever and has on its upper end a handle 142 through which suitable adjusting and control elements extend for the carburetor 111 which is mounted at a point between the starting pump and the combustion chamber. The upper knurled control knob 143 serves for adjusting the gasoline supply by an adjustment of the needle valve, as shown in FIGURE 7, while the lower knurled control knob 144 serves for adjusting the air supply by an adjustment of the air intake funnel of the carburetor.

Figure 8:
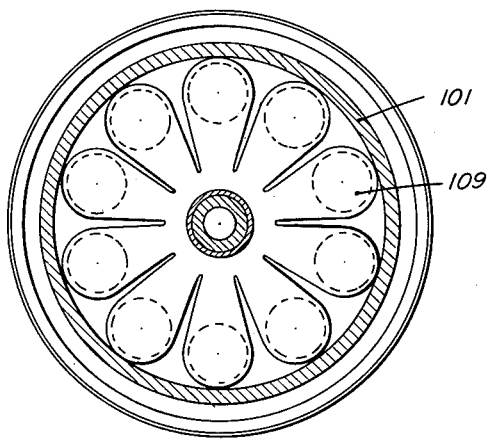
FIGURE 8 shows a cross section taken along line VIII—VIII of FIGURE 6 and illustrates the two compartments of the combustion chamber.

The flat valve 109 which is mounted between the two compartments 107 and 108 of the combustion chamber is shown in detail in FIGURE 8. It consists of a plurality of tongues 109 which are combined at the center and are secured to a mushroom-shaped supporting member, as illustrated in FIGURE 6. This supporting member also serves as a water-cooling means of the valve. The tongues of this valve 109 are adapted to open in the direction from compartment 107 into compartment 108, as indicated in dotted lines in FIGURE 6. When the valve is in the closed position, the individual tongues engage against abutments on the wall 101 of the combustion chamber.

At the inlet side, compartment 107 is closed by a spring-loaded disk valve 110 through which the fuel mixture is drawn into the combustion chamber. The combustion air then flows to the carburetor 111 through the openings 112 in the pump housing and through piston 113 of the hand-operated air pump which, when the engine is in operation, is in a stationary position. Also in this embodiment of the invention the outer surface of pump piston 113 on the connecting rod or shaft thereof is in tight engagement with the wall of the pump cylinder, and the bottom of the piston contains a pair of flaps 130 which are adapted to open in the downward direction, as indicated in dotted lines in FIGURES 5 and 11, when the fuel mixture is drawn into the combustion chamber. A spring 131 tends to maintain the pump piston in its lower end position. As soon as the suction flow of the fuel mixture to the combustion chamber ceases, flaps 130 will be returned to their horizontal closing position as indicated by the full lines in FIGURE 5, by means of small torsion coil springs 141 which are mounted on the pivot pins of the flaps and each of which has two arms which engage on the body of the pump piston and on the flap, respectively. Behind the inlet valve 110, as seen in the direction of flow of the fuel mixture, a spark plug 114 extends into the combustion chamber similarly as the spark plug 14 in the embodiment according to FIGURES 1 to 3, and its operation is also controlled by an ignition apparatus which is similar to that as previously described with reference to FIGURE 4.

Spark plug 114 and the carburetor housing 132 are contained within a streamlined sheathing which is connected to the wall 103 of the thrust tube. The cable leading to the spark plug and the fuel line leading to the carburetor extend in an upward direction. In order to prevent the occurrence of any changes in the mixing ratio of the gasoline and air during the operation of the engine due to the fact that during the operation of the pump a higher pressure occurs in the carburetor and its float housing 132 than during the suction intake of the fuel mixture, the upper part of housing 132 at a point above the fuel level therein is also in this embodiment connected by a passage in the form of a small tube 133 to the lower part of the pump chamber. Thus, there will always be the same difference in pressure between the carburetor nozzle and the float housing, regardless of whether the engine exerts a suction or whether the pump is being actuated. The same carburetor adjustment may therefore be applied for the fuel intake by suction and by pumping.

As soon as the atomized combustible mixture is ignited by spark plug 114, the pressure wave then occurring pushes the mixture from the first compartment 107 through the flutter valve 109 more quickly into the second compartment 108 than the flames can spread. Thus, a pre-compressed fuel-air mixture is attained in the second compartment 108 which results in a much higher power output. The flame finally passes through flutter valve 109, which is made of a highly heat-resistant material, and it then also ignites the compressed mixture in compartment 108. The expanding combustion gases then pass with great force through flap valve 106 into thrust tube 102 and eject the water contained therein from the rear end of the thrust tube in the direction as shown by arrow 115.

During this operation, check valve 116 in the front part of the thrust tube is automatically closed to prevent the water from being also ejected through the inlet opening 117. Thrust tube 103 is made of such a length that the expanding gases will be able to push the water only approximately to a point as indicated by the dotted line 150 in FIGURE 5. Behind this point, the gases will again contract. Due to this contraction and the inertia of the quickly ejected water, a vacuum will be formed in chambers 107 and 108 whereby a new supply of fuel mixture will be sucked in through disk valve 110, carburetor 111, and pump 104. This vacuum also acts through the revolving check valve 116 to suck water through the front inlet opening 117 so as to refill thrust tube 102, 103. This refilling operation is assisted by the pressure head produced by the driving speed of the engine in the water, and it therefore proceeds very quickly. Thereafter, the same operation is repeated which has been previously described.

Figure 9:
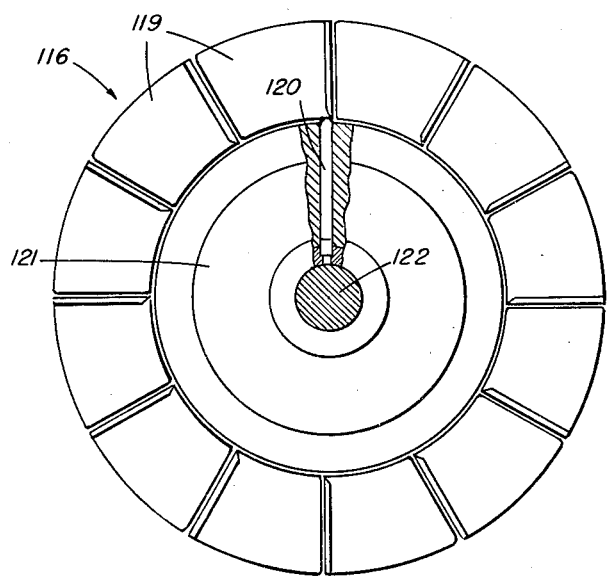
FIGURE 9 shows a cross section taken along line IX—IX of FIGURE 6 and illustrates the rotary check valve according to the invention.
Figure 10:
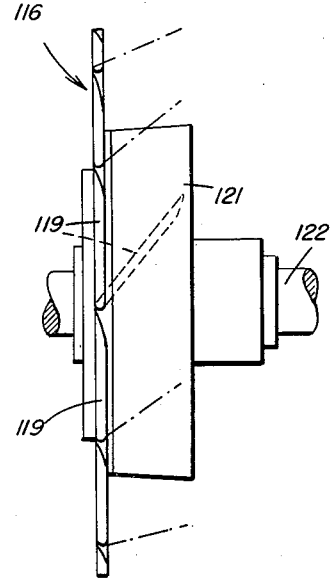
Figure 11:
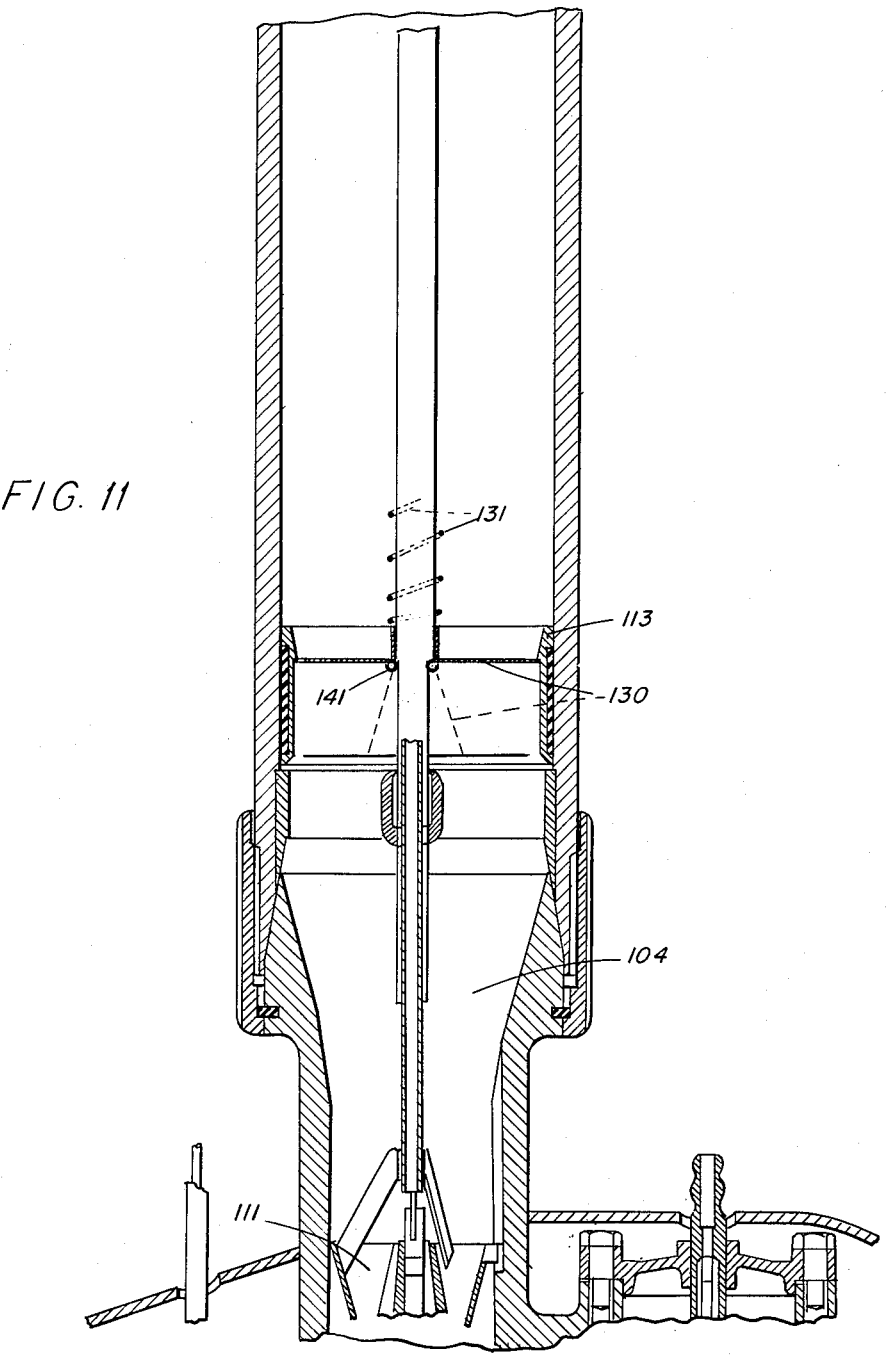
FIGURE 11 shows an enlarged central longitudinal section of the lower part of the starting pump of the embodiment according to FIGURE 5.

The water inlet valve 116 which also operates as a check valve is illustrated in detail in FIGURES 9 and 10. Like valve 16 in FIGURES 1 to 3 it is designed in the form of a freely revolving turbine wheel. However, while valve 16 is mounted on a central supporting element which is specially provided for this purpose within the thrust tube, valve 116 according to FIGURES 5 and 6 is mounted directly on the body enclosing the combustion chamber within the thrust tube. For this purpose, the front end of this body carries a wheel hub 121 which is freely rotatable about the central shaft 122 like a small free-air turbine when the water passes through the front inlet opening 117 into thrust tube 102. Hub 121 carries a plurality of pivot pins 120 which extend in a radial direction from shaft 122 and support vanelike blades or flaps 119 which are pivotable about pins 120. Streamlined head and tail portions 123 and 124 on the front and rear ends of the body containing the combustion chamber at the inside of the thrust tube insure that the water will flow into and from the thrust tube with as little friction and turbulence as possible. When the water enters into the front part 102 of the thrust tube, blades 119 together with hub 121 revolve at a high speed similar to a turbine wheel and in the same manner as previously described with reference to FIGURES 1 to 3. After each explosion, valve 116 will close for a short time during which blades 119 will engage with the concentrical edge portions 125 serving as abutments, and will then form an annular closed disk which prevents any water from flowing back in the direction toward the inlet opening 117. Also in this case as described with reference to the first embodiment it is advisable to sharpen the front edges of blades 119 for cutting up any aquatic plants which might be drawn into the thrust nozzle together with the water. Furthermore, the rear end of thrust tube 103 may also be provided with a trumpet-shaped outlet 129 which is adapted to increase the recoil force.

The engine according to FIGURES 5 to 11 may be started in substantially the same manner as described with reference to the first embodiment, namely, by pulling up the pump handle 142 to raise pump piston 113 against the action of spring 131, so that the air will flow through the then opened valve 130 into pump chamber 104. When releasing the pump handle, spring 131 will again force the pump piston downwardly, whereby the air is forced by the closed flaps 130 downwardly past the carburetor outlet and through inlet valve 110 into compartment 107 of the combustion chamber. The further operation then proceeds in the same manner as described with reference to the first embodiment.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. A jet propulsion engine for watercraft, comprising a combustion chamber forming at least two separate compartments, at least one check valve separating the adjacent compartments from each other, means for supplying a mixture of air and an easily and quickly combustible fuel into the first of said compartments, ignition means for igniting said fuel mixture in successive explosions in said first compartment and conveying it by the initial combustion of said mixture into the subsequent compartment through said check valve and thereby compressing and exploding said mixture in said subsequent compartment, a thrust tube having a water inlet opening, a discharge opening, and an opening connecting said thrust tube with the last of said compartments of said combustion chamber, a valve in said opening between said last compartment and said thrust tube, a rotary check valve having a low inertia and being quickly reacting disposed within said water inlet opening and comprising a turbine-like wheel having a hub mounted within said thrust tube, and a plurality of blades, each mounted on said hub so as to be pivotable about an axis extending from said hub from an open position, in which the water may pass intermediate successive explosions in said combustion chamber through said inlet opening and between said open blades into said thrust tube, to a closed position during said explosions, at which time the combustion gases from said combustion chamber pass through said valve into said thrust tube to eject the water from said thrust tube through said discharge opening.

2. A jet propulsion engine for watercraft as defined in claim 1, in which said ignition means comprise a source of high tension of direct current, at least one condenser, a pair of spark gaps connected in series, said condenser and said spark gaps being connected in parallel to said source, one of said spark gaps forming an auxiliary spark gap adapted to cause said condenser to discharged when it has reached a certain flashover voltage on said spark gap, the other spark gap forming a spark plug in said combustion chamber, the flashover on said auxiliary spark gap also resulting in a flashover on said spark plug, and means for adjusting the electrodes of said auxiliary spark gap to a greater intermediate distance during the starting period of said engine and for adjusting said electrodes to a smaller distance during the continued operation of said engine.

3. A jet propulsion engine for watercraft as defined in claim 1, in which each of said pivotable blades of said water inlet valve has a sharpened edge for reducing friction and for cutting up foreign matter entering with the water into said water inlet opening.

4. A jet propulsion engine for watercraft as defined in claim 1, in which the front part of said thrust tube intermediate said water inlet opening and said rotary check valve has an outer wall of a resilient material.

5. A jet propulsion engine for watercraft as defined in claim 1, in which a rear part of said thrust tube through which the water and the combustion gases are ejected has an expanded portion serving as a cushion to suppress vibrations.

6. A jet propulsion engine for watercraft as defined in claim 1, in which said combustion chamber is mounted within said thrust tube.

7. A jet propulsion engine for watercraft as defined in claim 6, in which said combustion chamber forms an elongated streamlined body mounted within the front part of said thrust tube and extending substantially coaxially therewith so that an annular channel is formed between the walls of said body and of said thrust tube, said opening of said last compartment of said combustion chamber into said thrust tube being disposed near the front end of said thrust tube and behind said rotary check valve and terminating into said annular channel.

8. A jet propulsion engine as defined in claim 7, in which the shaft of said rotary check valve is rotatably mounted in the front end of said body of said combustion chamber.

9. A check valve for flowing media comprising a turbinelike wheel having a hub, means for mounting said hub so as to be rotatable about its central axis, and a plurality of vanes, each mounted on said hub so as to be pivotable about an axis extending from said hub and directly behind the inlet edge of said vane so that, when a flowing medium acts upon the front side of said valve, said vanes will be pivoted in the direction of flow of said medium to permit said medium to flow through said valve, while when said medium acts upon the rear side of said valve, said vanes will be turned so as to extend transversely to said direction of flow and thereby to close said valve.

10. A check valve for flowing media comprising a turbine like wheel having a hub as in claim 9, said check valve being mounted in the thrust tube of a jet propulsion engine.

11. A jet propulsion engine comprising a thrust tube having a fluid inlet opening and a fluid discharge opening, rotary valve means in the inlet opening of said thrust tube for controlling the flow of water therethrough, a combustion chamber forming at least two separate compartments, at least one check valve separating the adjacent compartments from each other, means for applying a mixture of air and an easily and quickly combustible fuel into the first of said compartments, ignition means for igniting said fuel mixture in successive explosions in said first compartment and conveying it by the initial combustion of said mixture into the subsequent compartment through said check valve and thereby compressing and exploding said mixture in said subsequent compartment, and discharge means for connecting said thrust tube with said combustion chamber so that the combustion gases from said combustion chamber may pass through said discharge means into said thrust tube to eject fluid from said thrust tube through said discharge opening.

12. A jet propulsion engine as in claim 11 where said combustion chamber is located entirely within said thrust tube.

References Cited in the file of this patent

UNITED STATES PATENTS

| 2,319,947 | Oswood | May 25, 1943 |
| 2,710,524 | Frank | June 14, 1955 |
| 2,714,800 | Gongwer | Aug. 9, 1955 |
| 2,826,721 | Smits | Mar. 11, 1958 |
| 2,831,499 | Myron | Apr. 22, 1958 |
| 2,900,790 | Reimers | Aug. 25, 1959 |

FOREIGN PATENTS

| 750,516 | Germany | Jan. 15, 1960 |